(12) United States Patent
Oustiogov et al.

(10) Patent No.: US 8,775,958 B2
(45) Date of Patent: Jul. 8, 2014

(54) ASSIGNING Z-ORDER TO USER INTERFACE ELEMENTS

(75) Inventors: Maxim Oustiogov, Seattle, WA (US); Erik De Bonte, Woodinville, WA (US); Gerrit Hofmeester, Redmond, WA (US); Martin Mladenovski, Seattle, WA (US); Kamil Umut Sargut, Kirkland, WA (US); Robin Ghi-Hao Lim, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/760,048

(22) Filed: Apr. 14, 2010

(65) Prior Publication Data

US 2011/0258566 A1 Oct. 20, 2011

(51) Int. Cl.
*G06F 3/048* (2013.01)

(52) U.S. Cl.
CPC ..................................... *G06F 3/048* (2013.01)
USPC .......................................................... 715/766

(58) Field of Classification Search
None
See application file for complete search history.

(56) References Cited

U.S. PATENT DOCUMENTS

| | | | |
|---|---|---|---|
| 5,818,361 A | 10/1998 | Acevedo | |
| 6,025,841 A | 2/2000 | Finkelstein et al. | |
| 6,271,839 B1 | 8/2001 | Mairs et al. | |
| 7,389,475 B2 | 6/2008 | Clow et al. | |
| 2001/0000811 A1* | 5/2001 | May et al. | 709/205 |
| 2005/0223334 A1 | 10/2005 | Guido et al. | |
| 2006/0107226 A1* | 5/2006 | Matthews et al. | 715/766 |
| 2006/0248471 A1 | 11/2006 | Lindsay et al. | |
| 2006/0253791 A1 | 11/2006 | Kuiken et al. | |
| 2008/0115081 A1 | 5/2008 | Sankaravadivelu et al. | |
| 2009/0143141 A1* | 6/2009 | Wells et al. | 463/37 |
| 2010/0037175 A1* | 2/2010 | West | 715/788 |
| 2010/0083146 A1* | 4/2010 | Hasuike et al. | 715/760 |
| 2011/0179364 A1* | 7/2011 | Morris | 715/764 |

OTHER PUBLICATIONS

"Window Features", Retrieved at<<http://msdn.microsoft.com/en-us/library/ms632599(VS.85).aspx>>, Jan. 25, 2010, pp. 15.
George, et al., "Selector Control: Supporting Categorical Selections Within Multi-User, Multi-Touch Applications", Retrieved at<<http://mrduediligence.com/ieee_tabletop2008_selector_control.pdf>>, Jan. 25, 2010, pp. 2.

* cited by examiner

*Primary Examiner* — Matt Kim
*Assistant Examiner* — Tuan S Nguyen
(74) *Attorney, Agent, or Firm* — Jeremy Snodgrass; Glen Johnson; Micky Minhas

(57) ABSTRACT

Various embodiments related to assigning z-order to a plurality of user interface elements are disclosed. One disclosed embodiment provides a method of assigning a z-ordering to a user interface element displayed on a multi-user interactive display based upon an interaction state of the user interface element, the interaction state being dependent upon how a user interacts with the user interface element. The method comprises detecting a change in the interaction state of the user interface element. If the change is an initiation of a movement of the user interface element on the display, the user interface element is moved to a first predetermined position within the z-ordering. If the change is an initiation of a user interaction with content contained within the user interface element, the user interface element is moved to a second predetermined position within the z-ordering.

12 Claims, 5 Drawing Sheets

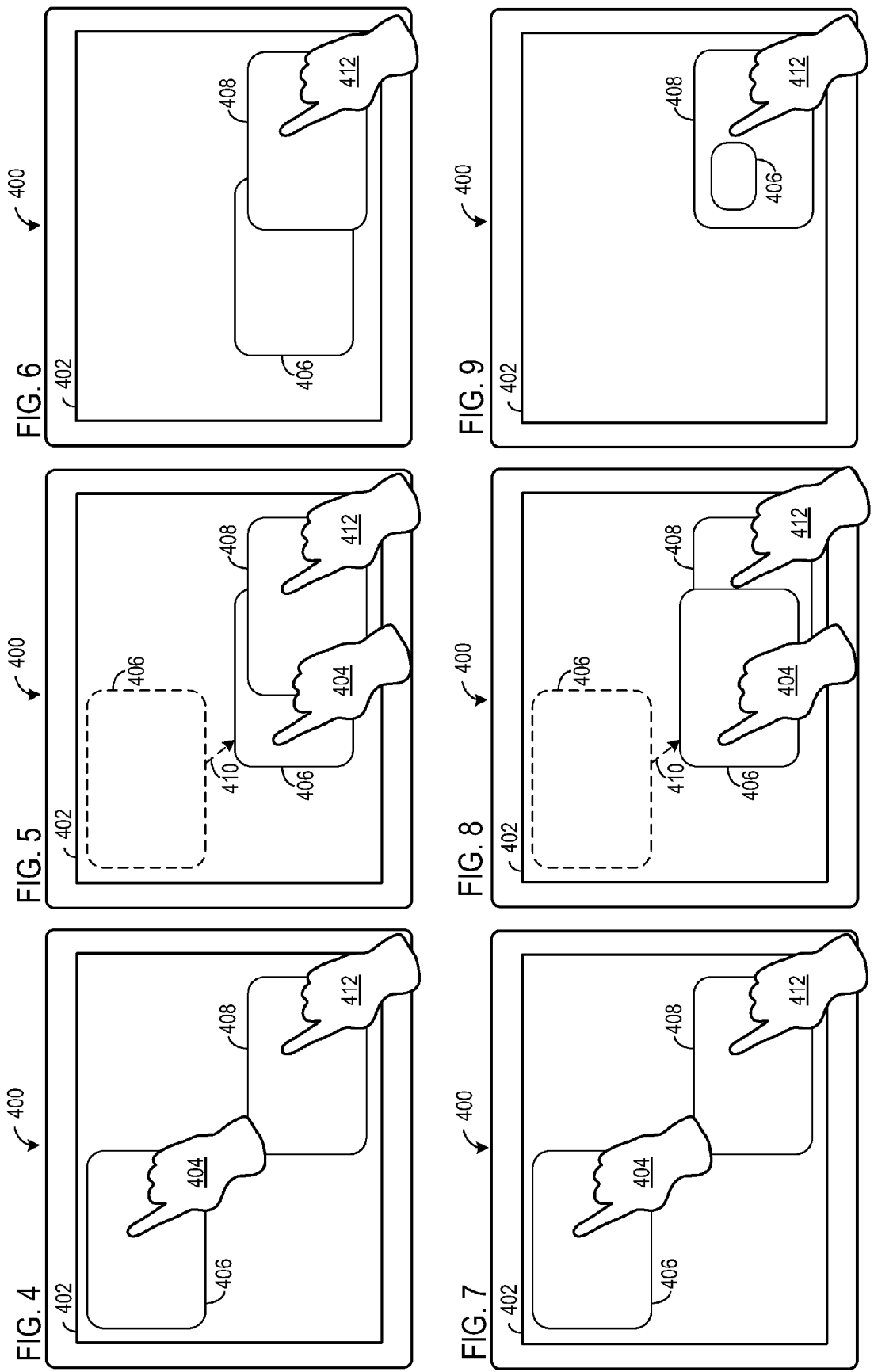

ASSIGNING Z-ORDER TO USER INTERFACE ELEMENTS

BACKGROUND

Graphical user interfaces with multi-touch displays may be configured to accept input simultaneously from a plurality of users. Further, each user may interact with one or more user interface elements that are displayed by the multi-touch display. For example, two users may interact with a set of digital images and each user may manipulate a different digital image from the set at the same time. As such, there may be several active user interface elements on the multi-touch display that have the potential to overlap as users manipulate the elements.

Therefore, user interface elements on a graphical user interface are assigned a z-ordering to determine which user interface elements are displayed in front of other elements in the case of overlap. Such z-ordering may affect various functionalities, such as drag-and-drop actions.

SUMMARY

Accordingly, various embodiments related to assigning z-order to a plurality of user interface elements are disclosed herein. For example, one disclosed embodiment provides, in a multi-user interactive display device comprising a display, a method of assigning a z-ordering to a user interface element displayed on the display based upon an interaction state of the user interface element, the interaction state being dependent upon how a user interacts with the user interface element. The method comprises detecting a change in the interaction state of the user interface element. If the change is an initiation of a movement of the user interface element on the display, the user interface element is moved to a first predetermined position within the z-ordering. If the change is an initiation of a user interaction with content contained within the user interface element, the user interface element is moved to a second predetermined position within the z-ordering. If the change is a cessation of a user interaction with the user interface element, the user interface element is moved to a third predetermined position within the z-ordering.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4-6 show an example of a movement of a user interface element on a multi-touch display according to an embodiment of the present disclosure.

FIGS. 7-9 show another example of a movement of a user interface element on a multi-touch display according to an embodiment of the present disclosure.

DETAILED DESCRIPTION

Various embodiments are disclosed herein that related to assigning z-order to a plurality of user interface element displayed on a multi-touch display. As mentioned above, when multiple users are interacting with a plurality of user interface elements, one or more active user interface elements can overlap. Depending on the z-ordering of the user interface elements, such overlap may support or obstruct various functionalities, such as drag-and-drop functionalities. Prior to discussing the assigning of z-order to user interface elements on a multi-touch display, a schematic view of a use environment of a multi-touch display is described with reference to FIG. 1 and an embodiment of an example computing device including a multi-touch display is described with reference to FIG. 2.

Figure 1:
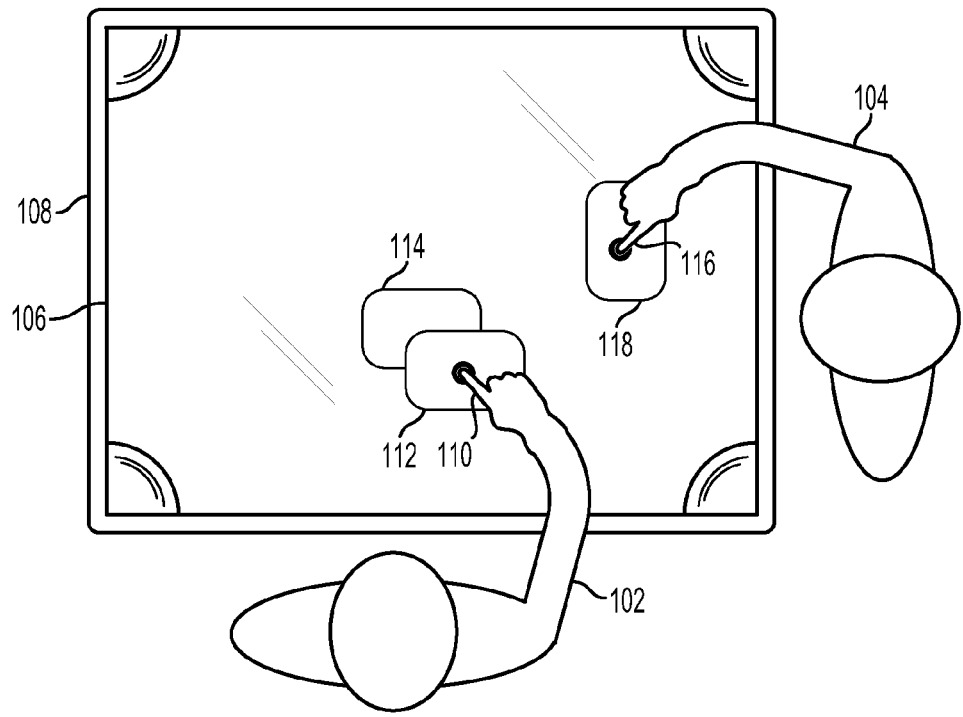
FIG. 1 shows a schematic view of users interacting with an embodiment of a multi-user interactive display device.

FIG. 1 shows a schematic view of two users 102 and 104 interacting with a surface 106 of an embodiment of a multi-touch display 108. As depicted, user 102 is manipulating user interface element 112 via a touch (e.g., finger 110) and user 104 is manipulating user interface element 118 via a touch (e.g., finger 116). A third user interface element 114 is shown positioned partially underneath user interface element 112.

Figure 2:
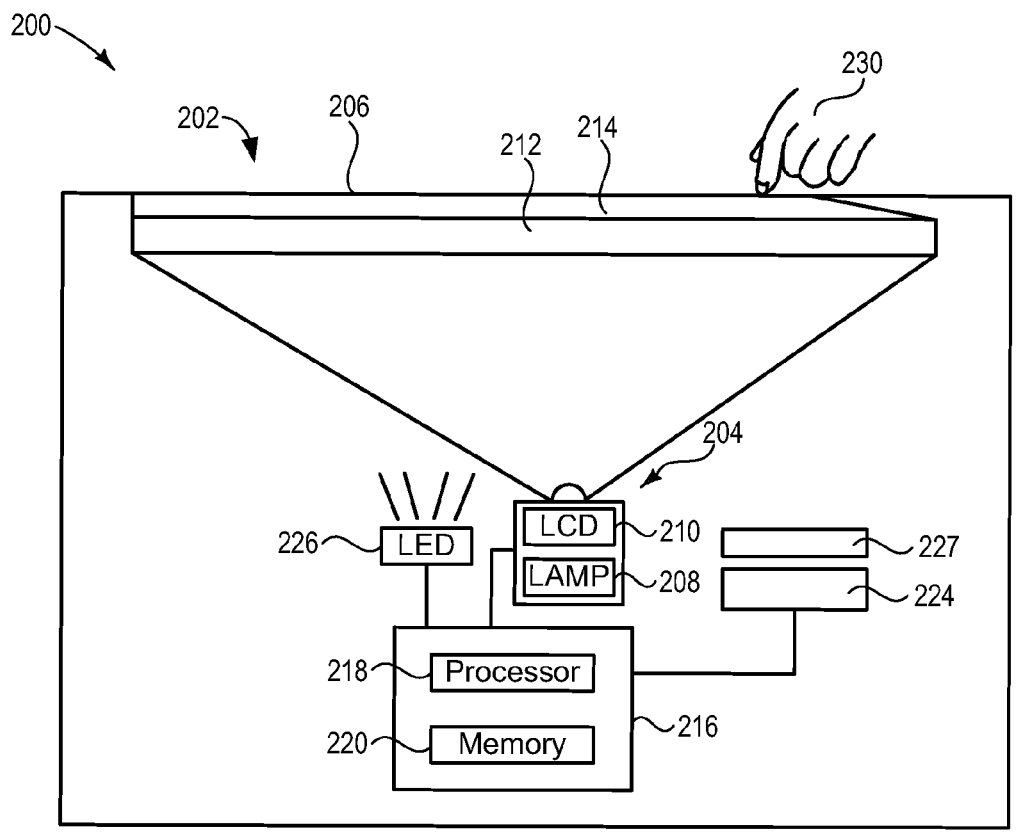
FIG. 2 shows a schematic view of an embodiment of a computing device including an interactive display.

Continuing to FIG. 2, a schematic depiction of an embodiment a surface computing device 200 comprising a multi-touch display 202 is shown. The multi-touch display 202 comprises a projection display system having an image source 204, and a display screen 206 onto which images are projected. While shown in the context of a projection display system, it will be appreciated that the embodiments described herein may also be implemented with other suitable display systems, including but not limited to LCD panel systems. Further, while described herein in the context of a multi-touch input device, it will be understood that the disclosed embodiments may be used with any other suitable input device, including but not limited to systems configured to accept input from a plurality of mouse devices, etc.

The image source 204 includes a light source 208 such as a lamp (depicted), an LED array, or other suitable light source. The image source 204 also includes an image-producing element 210 such as the depicted LCD (liquid crystal display), an LCOS (liquid crystal on silicon) display, a DLP (digital light processing) display, or any other suitable image-producing element.

The display screen 206 includes a clear, transparent portion 212, such as sheet of glass, and a diffuser screen layer 214 disposed on top of the clear, transparent portion 212. As depicted, the diffuser screen layer 214 acts as a touch surface. In other embodiments, an additional transparent layer (not shown) may be disposed over diffuser screen layer 214 as a touch surface to provide a smooth look and feel to the display surface. Further, in embodiments that utilize a LCD panel rather than a projection image source to display images on display screen 206, the diffuser screen layer 214 may be omitted.

Continuing with FIG. 2, the multi-touch display 202 further includes an electronic controller 216 comprising a processor 218 and a memory 220. It will be understood that memory 220 may be a computer-readable storage medium (e.g., disk, tape, etc.) comprising instructions (e.g., software)

stored thereon that is executable by the processor 218 to control the various parts of computing device 200 to effect the methods described herein.

To sense objects placed on display screen 206, the multi-touch display 202 includes an image sensor 224 configured to capture an image of the entire backside of display screen 206, and to provide the image to electronic controller 216 for the detection of objects appearing in the image. The diffuser screen layer 214 helps to avoid the imaging of objects that are not in contact with or positioned within a few millimeters of display screen 206. Because objects that are close to but not touching the display screen 206 may be detected by image sensor 224, it will be understood that the term "touch" as used herein also may comprise near-touch inputs.

The image sensor 224 may include any suitable image sensing mechanism. Examples of suitable image sensing mechanisms include but are not limited to CCD and CMOS image sensors. Further, the image sensing mechanisms may capture images of display screen 206 at a sufficient frequency to detect motion of an object across display screen 206. While the embodiment of FIG. 2 shows one image sensor, it will be appreciated that more than one image sensor may be used to capture images of display screen 206.

The image sensor 224 may be configured to detect light of any suitable wavelength, including but not limited to infrared and visible wavelengths. To assist in detecting objects placed on display screen 206, the image sensor 224 may further include an illuminant 226 such as one or more light emitting diodes (LEDs) configured to produce infrared or visible light to illuminate a backside of display screen 206. Light from illuminant 226 may be reflected by objects placed on display screen 206 and then detected by image sensor 224. Further, an infrared band pass filter 227 may be utilized to pass light of the frequency emitted by the illuminant 226 but prevent light at frequencies outside of the band pass frequencies from reaching the image sensor 224, thereby reducing the amount of ambient light that reaches the image sensor 224.

While described herein in the context of an optical touch-sensitive system, the embodiments described herein also may be used with any other suitable type of touch-sensitive input system or non-touch-sensitive system and with any suitable type of computing device. Examples of other such systems include, but are not limited to, capacitive and resistive touch-sensitive inputs. Further, while depicted schematically as a single device that incorporates the various components described above into a single unit, it will be understood that the multi-touch display 202 also may comprise a plurality of discrete physical parts or units connected as a system by cables, wireless connections, network connections, etc. It will be understood that the term "computing device" may include any device that electronically executes one or more programs, such as a user interface program. Such devices may include, but are not limited to, personal computers, laptop computers, servers, portable media players, hand-held devices, cellular phones, and microprocessor-based programmable consumer electronic and/or appliances.

FIG. 2 also depicts a hand 230 with a finger placed on display screen 206. Light from the illuminant 226 reflected by the finger may be detected by image sensor 224, thereby allowing the touch of the finger to be detected on the screen. While shown in the context of a finger, it will be understood that any other suitable manipulator or manipulators (e.g., one or more styluses, paint brushes, etc.) and/or object or objects (e.g., one or more cell phones, business cards, cameras, tags, etc.) may be used to interact with computing device 200.

Figure 3:
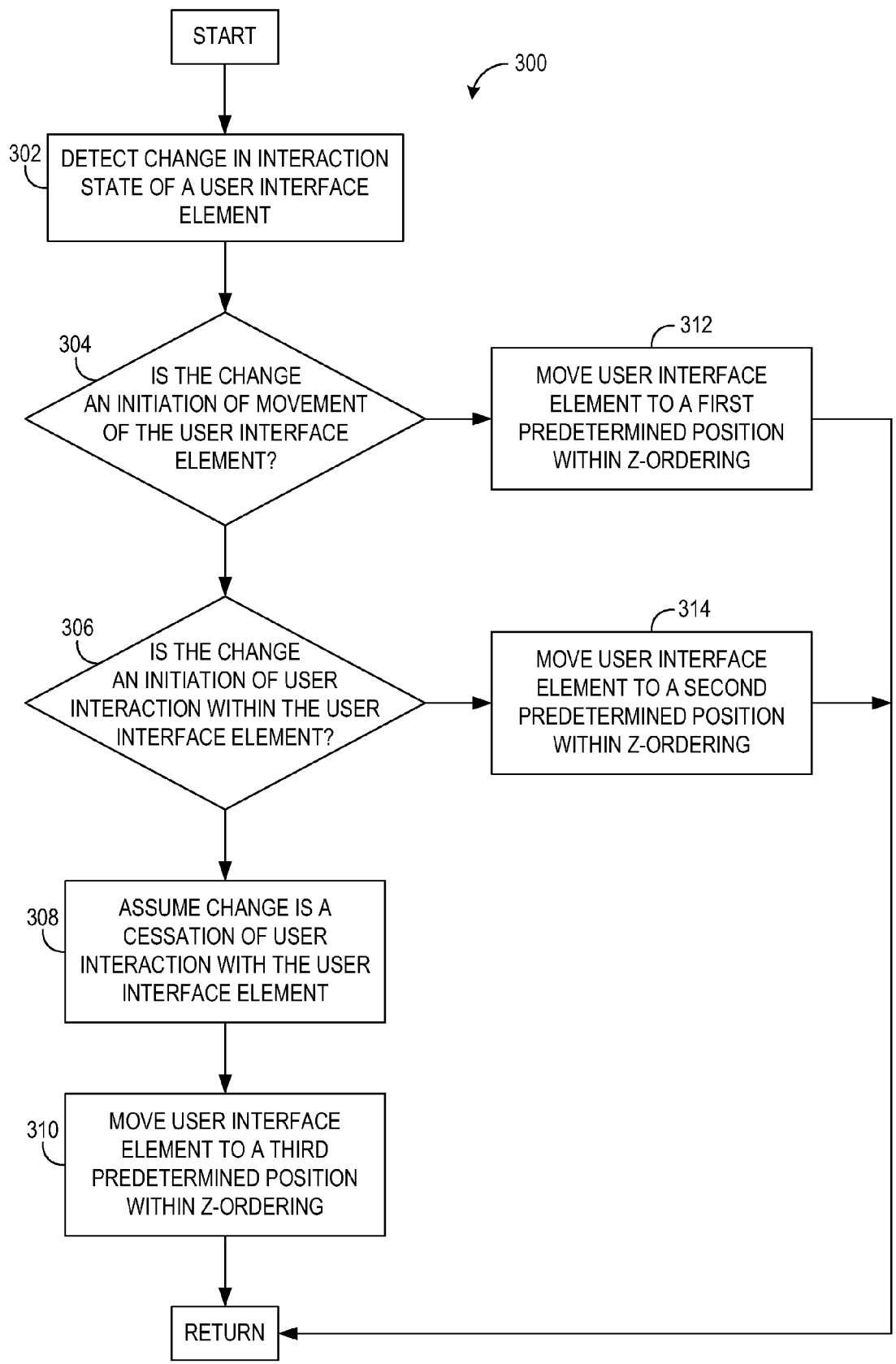
FIG. 3 shows a flow diagram illustrating an embodiment of a method of assigning a z-order to a user interface element.

FIG. 3 shows an embodiment of a method 300 of assigning a z-ordering to a user interface element displayed by the graphical user interface on the multi-touch display based upon an interaction state of the user interface element at an instant in time. Specifically, method 300 assigns a z-order to the user interface element based on how the user currently interacts with the user interface element. This may help to avoid problems caused by z-ordering that may arise in cases where a most-recently activated user interface element is automatically assigned a top z-ordering. For example, simply assigning a most-recently activated user interface element may cause difficulties where one user attempts to drag-and-drop a user interface element into a more-recently activated user interface element, as the dragged user interface element may pass behind the more-recently activated element due to its lower z-ordering.

At 302 of method 300, a change in interaction state of a user interface element is detected, wherein the interaction state of a user interface element is determined by a nature of a user's current interaction with the user interface element. Next, at 304, it is determined if the change is an initiation of movement of the user interface element. In some examples, the movement may be a dragging of the user interface element from one location on the display to another location on the display, or into another user interface element. Other examples of movement include rotating or resizing the user interface element. If it is determined that the change is an initiation of movement, method 300 moves to 312 where the user interface element is moved to a first predetermined position within the z-ordering. In some embodiments, the first predetermined position may be a top z-order position within a top z-order layer, as will be described in greater detail with reference to FIGS. 10-12. After the user interface element is moved to the first predetermined position, method 300 returns to the start to await a next change in interaction state. As such, a user interface element can be moved to another predetermined position within the z-order when the user interaction with the interface element ceases, for example.

On the other hand, if the change is neither an initiation of movement nor cessation of user interaction, method 300 continues to 306 where it is determined if the change is an initiation of user interaction with content contained within the user interface element. Interaction with content contained within the user interface element includes manipulating the content within the user interface element via a mouse, keyboard, stylus/pen, or touch input. For example, the user may use a mouse or touch input to highlight an object contained within the user interface element or modify text within the user interface element.

If it is determined that the change is an initiation of user interaction within the user interface element, method 300 moves to 314 where the user interface element is moved to a second predetermined position within the z-ordering. In some embodiments, the second predetermined position is farther from the top z-order position than the first predetermined position. For example, the second predetermined position may be located within a middle z-order layer that is below the top z-order layer. After the user interface element is moved to the second predetermined position, method 300 returns to the start. As described above, in this manner, a user interface element can move between z-order positions when user interaction with the interface element again changes.

If, instead, it is determined that the change is not an initiation of movement within the user interface element, method 300 proceeds to 308 where it is assumed that the change is a cessation of user interaction with the user interface element. Cessation of user interaction can be assumed because it has been determined that the user interface element and content within the user interface element are not being manipulated, and/or a touch input over the user interface element is no longer detected.

Finally, method 300 of FIG. 3 continues to 310 where the user interface element is moved to a third predetermined position within the z-order. In some embodiments, the third predetermined position is farther from a top z-order position than the first predetermined position and the second predetermined position. Further, the third predetermined position may be located within a third z-order layer that is below the middle z-order layer. After the user interface element is moved to the third predetermined position, method 300 returns to the start so that the user interface element again may be moved to a different position within the z-order when user interaction with the user interface element changes.

As described above, a user interface element may be assigned a z-order position in response to a user initiated movement of the user interface element such as dragging. FIGS. 4-6 show an example movement of a user interface element when z-order is not assigned according to method 300 described with reference to FIG. 3. As shown in FIG. 4, a user 404 may touch a user interface element 406 displayed on multi-touch display 402 of graphical user interface 400. Next, user 404 drags user interface element 406 towards user interface element 408 via a fluid movement, as indicated by arrow 410.

In the depicted embodiment, the content of user interface element 408 is currently being modified by another user 412. Without assigning a z-order as described above, user interface element 406 moves underneath user interface element 408 such that it is at least partially obscured by user interface element 408, as shown in FIG. 6.

In contrast, FIGS. 7-9 show an example of movement of a user interface element when z-order is assigned according to method 300 described with reference to FIG. 3. Similar to FIG. 4, FIG. 7 shows a user 404 initiating movement of a user interface element 406 by touching user interface element 406 displayed on multi-touch display 402 of graphical user interface 400.

User 404 drags user interface element 406 towards user interface element 408 via a fluid movement, as indicated by arrow 410 in FIG. 8. As mentioned above, content of user interface element 408 is currently being modified by another user 412. By assigning a z-order to the user interface elements based on the interaction state of the user interface element (i.e., how the user interacts with the user interface element), user interface element 406 can be successfully dragged on top of and dropped into user interface element 408, as shown in FIG. 9.

As an example, user interface element 406 may be a digital image and user interface element 408 may be a folder. While one user modifies content of the folder, another user may drag a digital image into the folder. When both the folder and the digital image are assigned a position in the z-order based on their respective interaction states, a user can add the digital image to the folder without the digital image falling under the folder. As another example, user interface element 406 also may be a folder, and the user may desire to move the folder so that it is a sub-folder of user interface element 408.

Figure 10:
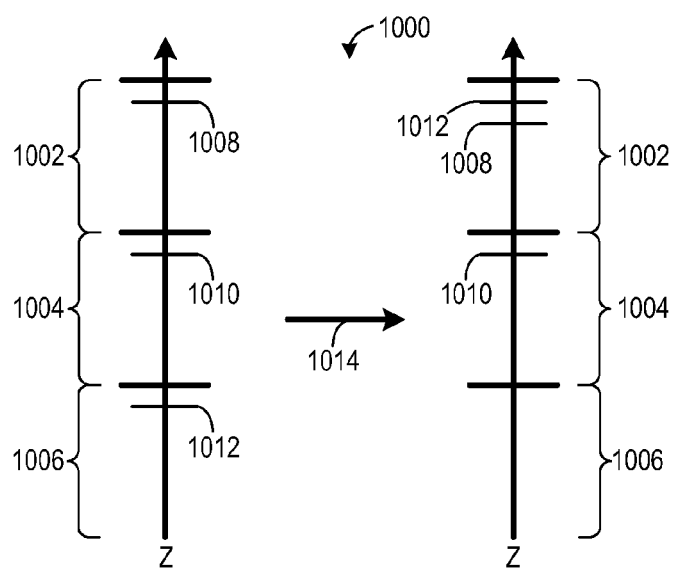
FIGS. 10-12 show examples of assigning a z-order to a user interface element according to an embodiment of the present disclosure.
Figure 11:
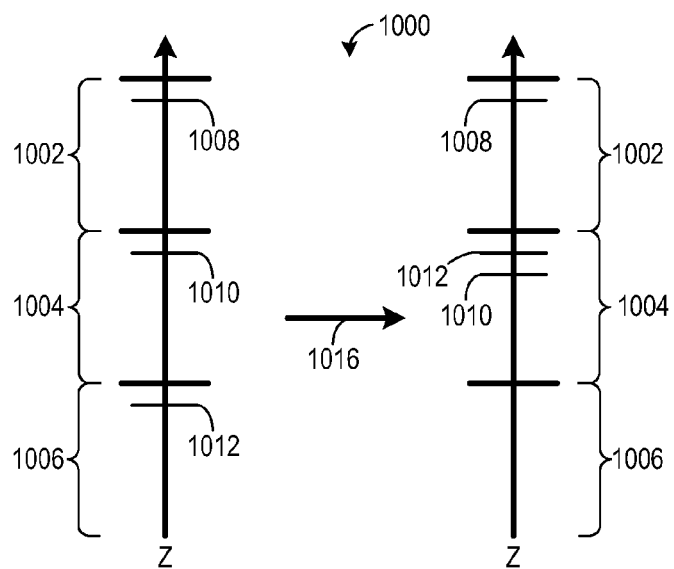
Figure 12:
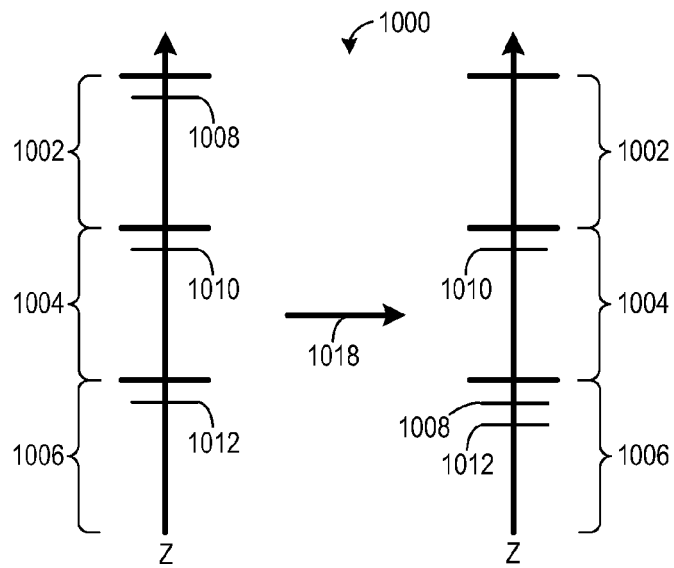

It will be understood that more than one user interface element can occupy a z-order layer. FIGS. 10-12 show examples of changing z-order 1000 of a plurality of user interface elements based on a change in interaction state. In each of FIGS. 10-12, a top z-order layer is indicated at 1002, a middle z-order layer is indicated at 1004, and a bottom z-order layer is indicated at 1006. The left hand side of each figure shows the z-ordering of a stack of user interface elements 1008, 1010, and 1012 before a change in interaction state of any of the user interface elements 1008, 1010, 1012.

In the example of FIG. 10, the interaction state of user interface element 1012 changes. As shown, initially user interface element 1012 is positioned in the bottom layer of the z-order, for example, a user may not be interacting with user interface element 1012. As indicated by arrow 1014, the interaction state of user interaction element 1012 changes. For example, a user may begin to move user interface element 1012. As a result, user interface element 1012 moves to top position of the z-order in the top z-order layer above user interface element 1008, as shown on the right hand side of FIG. 10.

User interaction element 1008 may remain in the top z-order layer while its interaction state remains unchanged, i.e., a user continues to drag, resize, rotate, etc. user interaction element 1008. For example, in the embodiments described herein, continuation of movement may imply movement interaction continues until all fingers (i.e., contacts) involved in the movement are removed from the surface. For example, if the user stops moving all fingers but the fingers remain in contact with the display surface, movement interaction may be considered to continue. Continuation of movement may also imply movement interaction continues as long as at least one of the fingers (i.e., contacts) involved in the movement interaction keeps moving. For example, if one or more of the fingers remain in contact with the display but all of the fingers in contact with the display stop moving, movement interaction may be considered to cease. Further, in other examples, the user may indicate that he is about to begin movement interaction via touch input and then use another input mechanism to perform the movement, such as keyboard arrow keys or mouse movement. Then, the user may indicate the movement interaction is over via touch input.

Continuing with FIG. 10, because user interface element 1012 is the newest user interface element to enter the top z-order layer, however, user interface element 1012 takes the top position in that layer and user interface element 1008 is positioned below it. In such a configuration, user interface element 1008 would fall under user interface element 1012 if they were positioned such that they were overlapping.

FIG. 11 shows another example of a change in interaction state, where arrow 1016 indicates a change in the user interaction state of user interaction element 1012. For example, a user may begin dragging a finger within a scroll view in user interaction element 1012. As a result, user interaction element 1012 moves to the top position in the middle z-order layer, as shown on the right hand side of FIG. 11. As described above, since user interaction element 1012 is the newest user interaction element to move to the middle z-order layer, it takes the top position in that layer and user interface element 1010 falls below it.

FIG. 12 shows a third example of movement within the z-ordering of the stack of user interaction elements. In this example, arrow 1018 indicates a change in interaction state of user interface element 1008. On the left side of FIG. 12, a user may be rotating user interaction element 1008 and, as such, user interaction element 1008 is in the top z-order layer. The user may, for example, cease contact with user interaction element 1008 and, thus, interaction with user interaction element 1008 ceases. As a result, user interaction element 1008 moves to the bottom z-order layer, as shown on the right hand side of FIG. 12. In a similar manner to that described above, user interaction element 1008 moves to the top position in the bottom z-order layer since it is the newest element to enter that layer, and user interaction element 1012 falls below it. It will be understood that the examples described above are presented for the purpose of example, and are not intended to be limiting in any manner.

Figure 13:
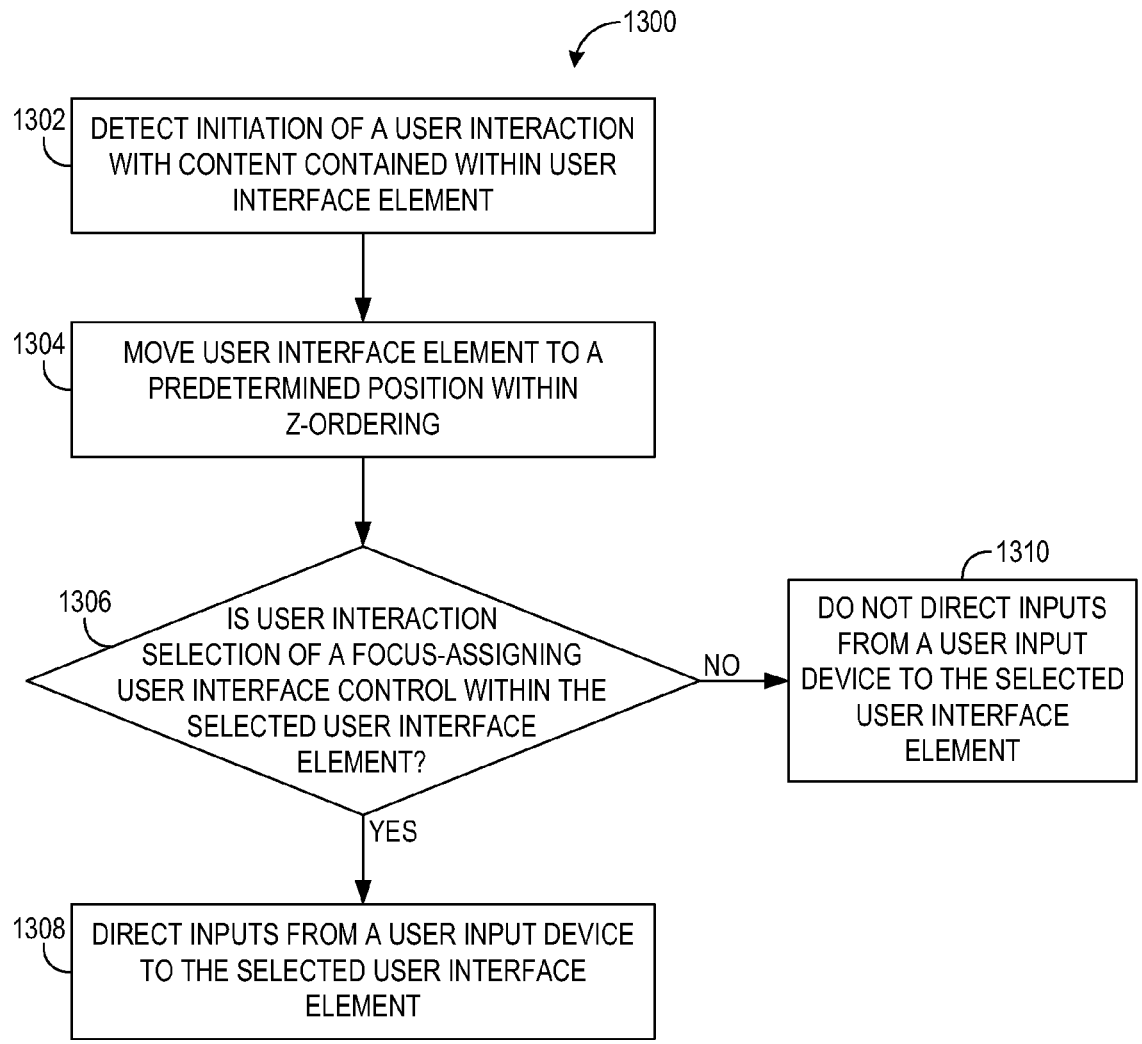
FIG. 13 shows a flow diagram illustrating an embodiment of a method of directing user inputs from a user input device to a selected user interface element.

Continuing to FIG. 13, the flow diagram in FIG. 13 illustrates a method 1300 of directing inputs from an indirect user input device (e.g., keyboard, voice, web camera, etc.) to a selected user interface element. The term "indirect user input device" represents input devices in which a user input does not inherently specify a location of a user input on a graphical user interface. In comparison, input from "direct" user input devices inherently specifies a location of an input (e.g. cursor-based mouse inputs, touch inputs, laser pointer inputs, etc.). Specifically, method 1300 determines if an initiation of user interaction with a selected user interface element is a selection of a "focus-assigning" user interface control and directs inputs from the indirect user input device accordingly.

The term "focus" describes a state in which a specified user interface element (i.e., the element that has focus) receives input from an indirect user input device. In conventional graphical user interfaces in which there is one active window at a time, focus is automatically assigned to the active window when it is initially activated. However, in a multi-touch display or other such multi-user computing device with multiple active windows, if focus is assigned based upon z-order, another window may lose focus in situations where focus is desired.

Therefore, instead of automatically assigning focus to a user interface element upon activation, method 1300 assigns focus only where the previously mentioned "focus-assigning" user interface control is selected. In this manner, a user interface element is assigned focus only if that application requests focus in response to a user interface input requesting focus.

At 1302 of method 1300, initiation of a user interaction with content contained within the selected user interface element is detected. Next, method 1300 continues to 1304 where the selected user interface element is moved to a predetermined position within the z-ordering, as described above.

Once the selected user interface element is moved to a predetermined position within the z-ordering, method 1300 proceeds to 1306 where it is determined if the user interaction is a selection of a focus-assigning user interface control within the selected user interface element. For example, the user may select to use a keyboard to input text to a user interface element. If it is determined that the user interaction is not a selection of a focus-assigning user interface control, method 1300 moves to 1310 and inputs from the indirect user input device are not directed to the selected user interface element.

On the other hand, if it is determined that the user interaction is a selection of a focus-assigning user interface control within the selected user interface element, method 1300 proceeds to 1308 where inputs from the indirect user input device are directed to the selected user interface element. For example, the user input device may be a keyboard and the user may begin typing in the selected user interface element.

It will be understood that more than one user interface element may have focus at any time. For example, where two users each desire to enter text into respective user interface elements, each user may request focus, and each user may be presented with a virtual keyboard (for example) so that the users can enter text in the different user interfaces with different virtual keyboards.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

This invention claimed is:

1. In a multi-user interactive display device comprising a display, a method of assigning a z-ordering to a user interface element displayed on the display based upon an interaction state of the user interface element, the interaction state being dependent upon how a user interacts with the user interface element, the method comprising:
   detecting a change in the interaction state of the user interface element;
   if the change is an initiation of a movement of the user interface element on the display, then moving the user interface element to a first predetermined position within the z-ordering, the first predetermined position being within a top z-order layer that includes a plurality of positions that are above a highest position of a middle order layer;
   if the change is not an initiation of a movement of the user interface element on the display but is an initiation of a user interaction with content contained within the user interface element, then moving the user interface element to a second predetermined position within the z-ordering that is different than the first predetermined position, the second predetermined position being within the middle z-order layer, the middle z-order layer including a plurality of positions that are below a lowest position of the top z-order layer; and
   if the change is a cessation of a user interaction with the selected user interface element, then moving the user interface element to a third predetermined position that is within a lower z-order layer that includes a plurality of positions that are below the middle z-order layer,
   where more than one user interface element occupies a z-order layer, and within each layer, a most recent user interface element to occupy the layer is located at a top z-order position within the layer.

2. The method of claim 1, where the lower z-order layer is a bottom z-order layer.

3. The method of claim 1, where movement of the user interface element on the display includes one or more of dragging, flicking, rotating, and resizing the user interface element.

4. The method of claim 1, further comprising:
   detecting an initiation of a user interaction with content contained within a selected user interface element;
   if the user interaction is selection of a focus-assigning user interface control within the selected user interface element, then directing inputs from an indirect user input device to the selected user interface element; and
   if the user interaction is not selection of the focus-assigning user interface control within the selected user interface element, then not directing inputs from the indirect user input device to the selected user interface element.

5. A computing device, comprising:
   a multi-touch display;
   a processor; and memory comprising instructions executable by the processor to:
- display on the display a plurality of user interface elements;
- detect a change in an interaction state of a selected user interface element, the interaction state being defined by a type of interaction a user makes with the selected user interface element at an instant in time;
- if the change in the interaction state is an initiation of a movement of the selected user interface element on the display, then move the selected user interface element to a first predetermined position within a z-ordering of the plurality of user interface elements, the first predetermined position being within a top z-order layer that includes a plurality of positions;
- if the change is not an initiation of a movement of the selected user interface element on the display but is an initiation of a user interaction with content contained within the selected user interface element, then move the selected user interface element to a second predetermined position within the z-ordering that is farther from a top z-order position than the first predetermined position, the second predetermined position being within a middle z-order layer that includes a plurality of positions that are below the top z-order layer; and
- if the change is a cessation of a user interaction with the selected user interface element, then move the selected user interface element to a third predetermined position that is farther from the top z-order position than the first predetermined position and the second predetermined position, the third predetermined position being within a bottom z-order layer that includes a plurality of positions that are below the middle z-order layer, where more than one interface element occupies a z-order layer, and within each layer a most recent interface element to occupy the layer is placed at the top z-order position of the layer.

6. The computing device of claim 5, where movement of the selected user interface element includes one or more of dragging, resizing, and rotating the selected user interface element.

7. The computing device of claim 5, where user interaction with content contained within the selected user interface element includes manipulating the content via a mouse, keyboard, stylus or touch input.

8. The computing device of claim 5, further comprising instructions executable by the processor to:
- detect an initiation of a user interaction with content contained within the user interface element;
- if the user interaction is selection of a focus-assigning user interface control within the selected user interface element, then direct inputs from an indirect user input device to the selected user interface element; and
- if the user interaction is not selection of the focus-assigning user interface control within the selected user interface element, then not to direct inputs from the indirect user input device to the selected user interface element.

9. A computing device, comprising:
- a multi-touch display;
- a processor; and
- memory comprising instructions executable by the processor to detect a change in an interaction state of a user interface element;
- if the change is an initiation of a movement of the user interface element on the display, then move the user interface element to a first predetermined position within a z-ordering, the first predetermined position being within a top z-order layer that includes a plurality of positions that are above a highest position of a middle z-order layer;
- if the change is not an initiation of a movement of the user interface element on the display but is an initiation of a user interaction with content contained within the user interface element, then move the user interface element to a second predetermined position within the z-ordering that is different than the first predetermined position, the second predetermined position being within the middle z-order layer, the middle z-order layer including a plurality of positions that are below a lowest position of the top z-order layer; and
- if the change is a cessation of a user interaction with the selected user interface element, then move the user interface element to a third predetermined position that is within a lower z-order layer that includes a plurality of positions that are below the middle z-order layer,
- where the instructions are further executable to occupy each z-order layer with more than one user interface element, and to stack the user interface elements in each layer such that a newest user interface element to occupy the layer is located at a top z-order position within the layer.

10. The computing device of claim 9, where the lower z-order layer is a bottom z-order layer.

11. The computing device of claim 9, where the instructions are executable to detect movement of the user interface element on the display as one or more of dragging, flicking, rotating, and resizing the user interface element.

12. The computing device of claim 9, wherein the instructions are further executable to
- detect an initiation of a user interaction with content contained within a selected user interface element;
- if the user interaction is selection of a focus-assigning user interface control within the selected user interface element, then direct inputs from an indirect user input device to the selected user interface element; and
- if the user interaction is not selection of the focus-assigning user interface control within the selected user interface element, then not direct inputs from the indirect user input device to the selected user interface element.

* * * * *